US012744927B2

(12) United States Patent
Kuo et al.

(10) Patent No.: US 12,744,927 B2
(45) Date of Patent: Sep. 22, 2026

(54) METHOD AND APPARATUS FOR CROSS-COMPONENT PREDICTION FOR VIDEO CODING

(71) Applicant: BEIJING DAJIA INTERNET INFORMATION TECHNOLOGY CO., LTD., Beijing (CN)

(72) Inventors: Che-Wei Kuo, Beijing (CN); Xiaoyu Xiu, San Diego, CA (US); Ning Yan, Hangzhou (CN); Hong-Jheng Jhu, Beijing (CN); Yi-Wen Chen, San Diego, CA (US); Wei Chen, San Diego, CA (US); Han Gao, Beijing (CN); Xianglin Wang, San Diego, CA (US); Bing Yu, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/767,887

(22) Filed: Jul. 9, 2024

(65) Prior Publication Data

US 2024/0373053 A1 Nov. 7, 2024

Related U.S. Application Data

(63) Continuation of application No. PCT/US2023/010395, filed on Jan. 9, 2023.

(Continued)

(51) Int. Cl.

*H04N 19/50* (2014.01)
*H04N 19/132* (2014.01)

(Continued)

(52) U.S. Cl.

CPC .......... *H04N 19/50* (2014.11); *H04N 19/132* (2014.11); *H04N 19/176* (2014.11);

(Continued)

(58) Field of Classification Search

CPC .... G06F 17/16; H04N 19/105; H04N 19/132; H04N 19/186; H04N 19/189; H04N 19/50; H04N 19/593; H04N 19/42

See application file for complete search history.

(56) References Cited

U.S. PATENT DOCUMENTS

2018/0077426 A1 3/2018 Zhang et al.
2018/0084284 A1 3/2018 Rosewarne et al.

(Continued)

FOREIGN PATENT DOCUMENTS

JP 2019-530330 A 10/2019

OTHER PUBLICATIONS

"Multiple Linear Regression for High Efficiency Video Intra Coding"—Zhang et al., 978-1-5386-4658-8/18/$31.00 A © 2019 IEEE (Year: 2019).*

(Continued)

*Primary Examiner* — Mainul Hasan

(74) *Attorney, Agent, or Firm* — Oblon, McClelland, Maier & Neustadt, L.L.P.

(57) ABSTRACT

A method for decoding video data. The method includes obtaining a video block from a bitstream; determining a region to derive a multiple linear regression (MLR) model; obtaining luma and chroma sample values in the region; deriving the MLR model using the luma and chroma sample values in the region; predicting each of chroma samples in the video block by applying the MLR model to corresponding luma samples for that chroma sample; and obtaining decoded video block using the predicted chroma samples.

20 Claims, 13 Drawing Sheets

Related U.S. Application Data

(60) Provisional application No. 63/298,159, filed on Jan. 10, 2022.

(51) Int. Cl.
*H04N 19/176* (2014.01)
*H04N 19/186* (2014.01)
*H04N 19/189* (2014.01)
*H04N 19/42* (2014.01)

(52) U.S. Cl.
CPC ......... *H04N 19/186* (2014.11); *H04N 19/189* (2014.11); *H04N 19/42* (2014.11)

(56) References Cited

U.S. PATENT DOCUMENTS

| | | | | |
|---|---|---|---|---|
| 2020/0145667 | A1 | 5/2020 | Filippov et al. | |
| 2021/0092395 | A1* | 3/2021 | Zhang | H04N 19/132 |
| 2021/0289198 | A1* | 9/2021 | Liao | H04N 19/107 |
| 2021/0289215 | A1* | 9/2021 | Helmrich | H04N 19/105 |
| 2021/0321090 | A1* | 10/2021 | Deng | H04N 19/11 |
| 2023/0036581 | A1* | 2/2023 | Wang | H04N 19/593 |
| 2024/0205453 | A1* | 6/2024 | Ma | H04N 19/186 |
| 2025/0184477 | A1* | 6/2025 | Ma | H04N 19/105 |

OTHER PUBLICATIONS

"Multiple Linear Regression for High Efficiency Video Intra Coding"—Zhang et al., 978-1-5386-4658-8/18/$31.00 © 2019 IEEE. (Year: 2019).*

"Effective Chroma Subsampling and Luma Modification for RGB Full-Color Images Using the Multiple Linear Regression Technique"—Chung et al., Digital Object Identifier 10.1109/ACCESS.2020.2999910, date of publication Jun. 4, 2020, (Year: 2020).*

International Search Report and Written opinion dated Apr. 12, 2023, issued in counterpart international application No. PCT/US2023/010395. (19 pages).

Zhang K et al: "Enhanced Cross-component Linear Model Intra-prediction", 4. JVET Meeting; Oct. 15, 2016-Oct. 21, 2016; Chengdu; (The Joint Video Exploration Team of ISO/IEC JTC1/SC29/WG11 and ITU-T SG.16); No. JVET-D0110-v4, Oct. 17, 2016 (Oct. 17, 2016), XP030150355; cited in European Search Report dated Nov. 28, 2025.

C-W Kuo (Kwai) et al: "EE2-1.1b and 1.2: Filter-based linear model and gradient linear model", 27. JVET Meeting; Jul. 13, 2022-Jul. 22, 2022; Teleconference; (The Joint Video Exploration Team of ISO/IEC JTC1/SC29/WG11 and ITU-T SG. 16 ), No. JVET-AA0125 ; m60101, Jul. 6, 2022 (Jul. 6, 2022), XP030302961; cited in European Search Report dated Nov. 28, 2025.

* cited by examiner

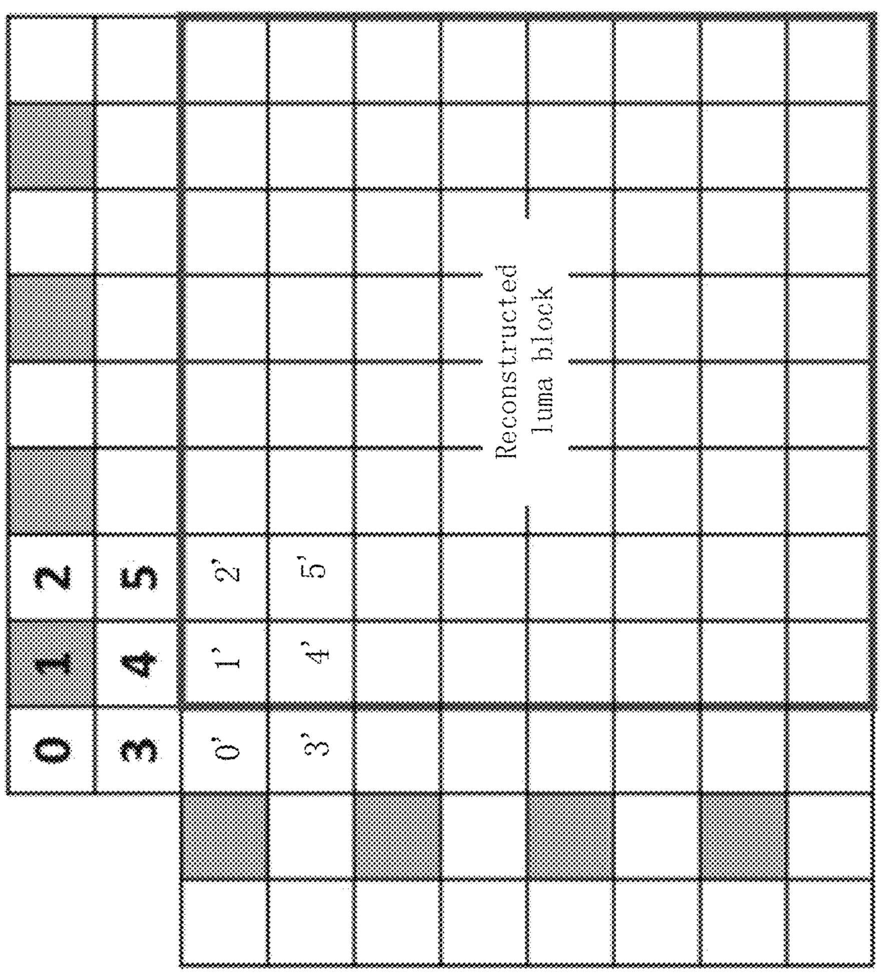
Fig. 10
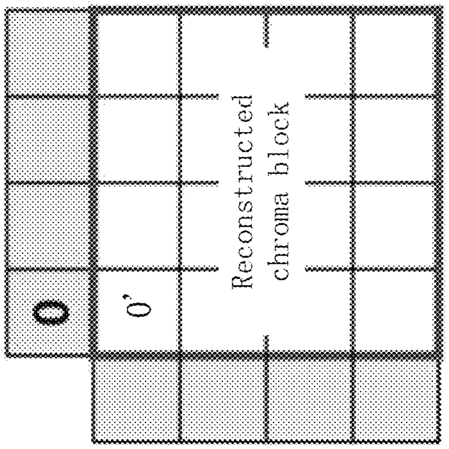

METHOD AND APPARATUS FOR CROSS-COMPONENT PREDICTION FOR VIDEO CODING

CROSS-REFERENCE TO RELATED APPLICATION

The present application is a continuation application of PCT application No. PCT/US2023/010395 filed on Sep. 1, 2023, which is based upon and claims priority to Provisional Applications No. 63/298,159, filed on Jan. 10, 2022. The disclosures of both prior applications are incorporated herein by reference in their entirety for all purposes.

FIELD

Aspects of the present disclosure relate generally to video coding and compression, and more particularly, to methods and apparatus for cross-component prediction technology.

BACKGROUND

Various video coding techniques may be used to compress video data. Video coding is performed according to one or more video coding standards. For example, video coding standards include versatile video coding (VVC), high-efficiency video coding (H.265/HEVC), advanced video coding (H.264/AVC), moving picture expert group (MPEG) coding, or the like. Video coding generally utilizes prediction methods (e.g., inter-prediction, intra-prediction, or the like) that take advantage of redundancy present in video images or sequences. An important goal of video coding techniques is to compress video data into a form that uses a lower bit rate, while avoiding or minimizing degradations to video quality.

To reduce the cross-component redundancy, a cross-component linear model (CCLM) prediction mode is commonly used in the video coding standards, for which the chroma samples are predicted based on the reconstructed luma samples of the same CU. In existing CCLM or Multi-model LM (MMLM) prediction mode, one or more linear prediction models are used for the prediction according to one or more sample groups into which luma samples are classified. The classification in the existing CCLM or MMLM prediction mode may generally consider the luma DC values, leaving potential spaces in other aspects that can further improve the coding efficiency.

SUMMARY

The following presents a simplified summary of one or more aspects according to the present disclosure in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an embodiment, there provides a method for decoding video data. The method comprises: obtaining a video block from a bitstream; determining a region to derive a multiple linear regression (MLR) model; obtaining luma and chroma sample values in the region; deriving the MLR model using the luma and chroma sample values in the region; predicting each of chroma samples in the video block by applying the MLR model to corresponding luma samples for that chroma sample; and obtaining decoded video block using the predicted chroma samples.

According to an embodiment, there provides a method for encoding video data. The method comprises: obtaining a video block from a video frame; determining a region to derive a multiple linear regression (MLR) model; obtaining luma and chroma sample values in the region; deriving the MLR model using the luma and chroma sample values in the region; predicting each of chroma samples in the video block by applying the MLR model to corresponding luma samples for that chroma sample; and obtaining encoded video block using the predicted chroma samples.

According to an embodiment, there provides a computer system comprising one or more processors and one or more storage devices storing computer-executable instructions that, when executed, cause the one or more processors to perform the operations including: obtaining a video block from a bitstream; determining a region to derive a multiple linear regression (MLR) model; obtaining luma and chroma sample values in the region; deriving the MLR model using the luma and chroma sample values in the region; predicting each of chroma samples in the video block by applying the MLR model to corresponding luma samples for that chroma sample; and obtaining decoded video block using the predicted chroma samples.

By using the proposed multiple linear regression (MLR) model, inter-sample correlation among the collocated luma sample, neighboring luma samples, and the chroma sample to be predicted may be captured, to further improve the prediction accuracy. Other advantages of the disclosure would be apparent from the following description.

BRIEF DESCRIPTION OF THE DRAWINGS

The disclosed aspects will hereinafter be described in connection with the appended drawings that are provided to illustrate and not to limit the disclosed aspects.

FIGS. 2A, 2B, 2C, 2D and 2E illustrate five splitting types, comprising quaternary partitioning, horizontal binary partitioning, vertical binary partitioning, horizontal ternary partitioning, and vertical ternary partitioning.

FIG. 10 shows an example that 6-tap is used in multiple linear regression (MLR) model according to one or more aspects of the present disclosure.

DETAILED DESCRIPTION

The present disclosure will now be discussed with reference to several example implementations. It is to be understood that these implementations are discussed only for enabling those skilled in the art to better understand and thus implement the embodiments of the present disclosure, rather than suggesting any limitations on the scope of the present disclosure.

The first version of the VVC standard was finalized in July, 2020, which offers approximately 50% bit-rate saving or equivalent perceptual quality compared to the prior generation video coding standard HEVC. Although the VVC standard provides significant coding improvements than its predecessor, there is evidence that superior coding efficiency can be achieved with additional coding tools. Recently, Joint Video Exploration Team (JVET) under the collaboration of ITU-T VECG and ISO/IEC MPEG started the exploration of advanced technologies that can enable substantial enhancement of coding efficiency over VVC. In April 2021, one software codebase, called Enhanced Compression Model (ECM) was established for future video coding exploration work. The ECM reference software was based on VVC Test Model (VTM) that was developed by JVET for the VVC, with several existing modules (e.g., intra/inter prediction, transform, in-loop filter and so forth) are further extended and/or improved. In future, any new coding tool beyond the VVC standard need to be integrated into the ECM platform, and tested using JVET common test conditions (CTCs).

Figure 1:
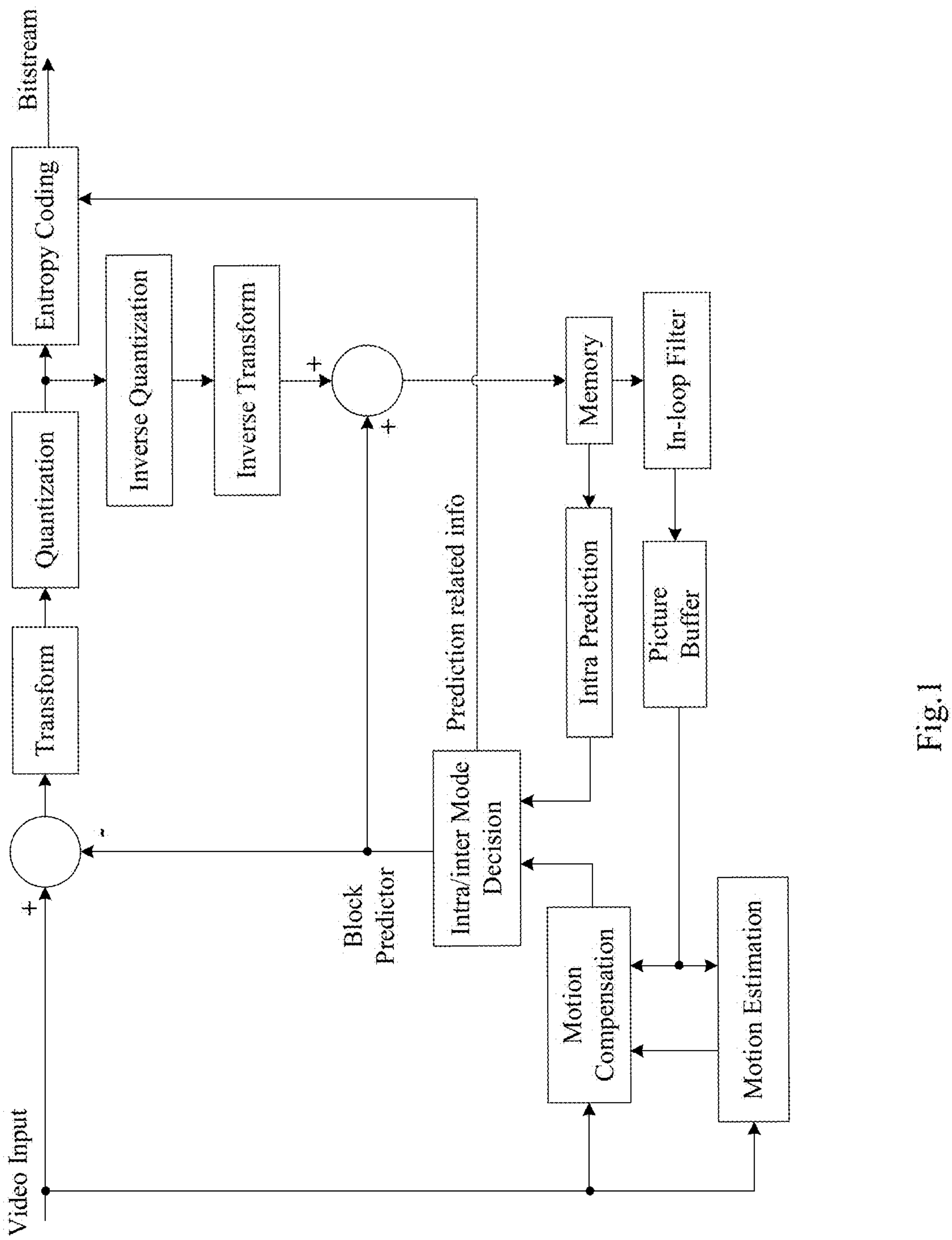
FIG. 1 illustrates a block diagram of a generic block-based hybrid video encoding system.
Figures 2A, 2B, 2C, 2D, 2E:
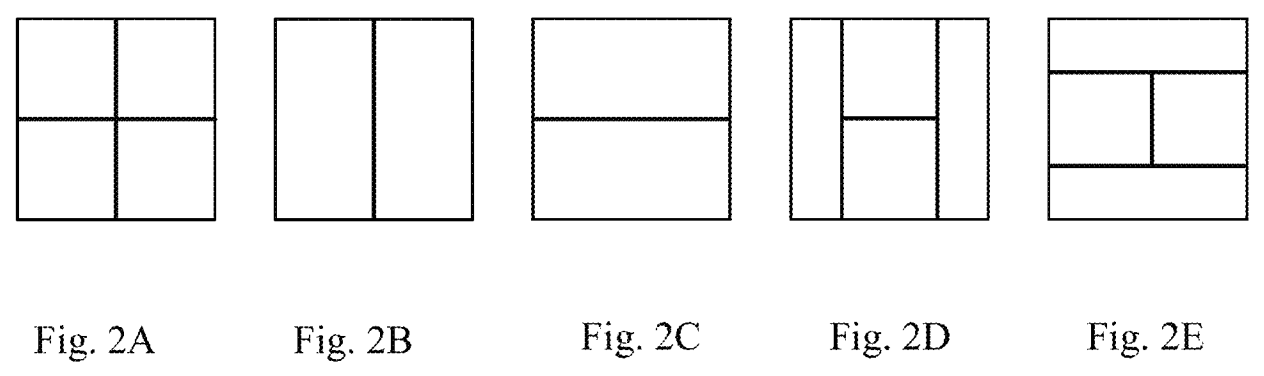

Similar to all the preceding video coding standards, the ECM is built upon the block-based hybrid video coding framework. FIG. 1 illustrates a block diagram of a generic block-based hybrid video encoding system. The input video signal is processed block by block (called coding units (CUs)). In ECM-1.0, a CU can be up to 128×128 pixels. However, same to the VVC, one coding tree unit (CTU) is split into CUs to adapt to varying local characteristics based on quad/binary/ternary-tree. In the multi-type tree structure, one CTU is firstly partitioned by a quad-tree structure. Then, each quad-tree leaf node can be further partitioned by a binary and ternary tree structure. As shown in FIGS. 2A, 2B, 2C, 2D and 2E, there are five splitting types, quaternary partitioning, vertical binary partitioning, horizontal binary partitioning, vertical extended quaternary partitioning, and horizontal extended quaternary partitioning. In FIG. 1, spatial prediction and/or temporal prediction may be performed. Spatial prediction (or "intra prediction") uses pixels from the samples of already coded neighboring blocks (which are called reference samples) in the same video picture/slice to predict the current video block. Spatial prediction reduces spatial redundancy inherent in the video signal. Temporal prediction (also referred to as "inter prediction" or "motion compensated prediction") uses reconstructed pixels from the already coded video pictures to predict the current video block. Temporal prediction reduces temporal redundancy inherent in the video signal. Temporal prediction signal for a given CU is usually signaled by one or more motion vectors (MVs) which indicate the amount and the direction of motion between the current CU and its temporal reference. Also, if multiple reference pictures are supported, one reference picture index is additionally sent, which is used to identify from which reference picture in the reference picture store the temporal prediction signal comes. After spatial and/or temporal prediction, the mode decision block in the encoder chooses the best prediction mode, for example based on the rate-distortion optimization method. The prediction block is then subtracted from the current video block; and the prediction residual is de-correlated using transform and quantized. The quantized residual coefficients are inverse quantized and inverse transformed to form the reconstructed residual, which is then added back to the prediction block to form the reconstructed signal of the CU. Further in-loop filtering, such as deblocking filter, sample adaptive offset (SAO) and adaptive in-loop filter (ALF) may be applied on the reconstructed CU before it is put in the reference picture store and used to code future video blocks. To form the output video bit-stream, coding mode (inter or intra), prediction mode information, motion information, and quantized residual coefficients are all sent to the entropy coding unit to be further compressed and packed to form the bit-stream.

Figure 3:
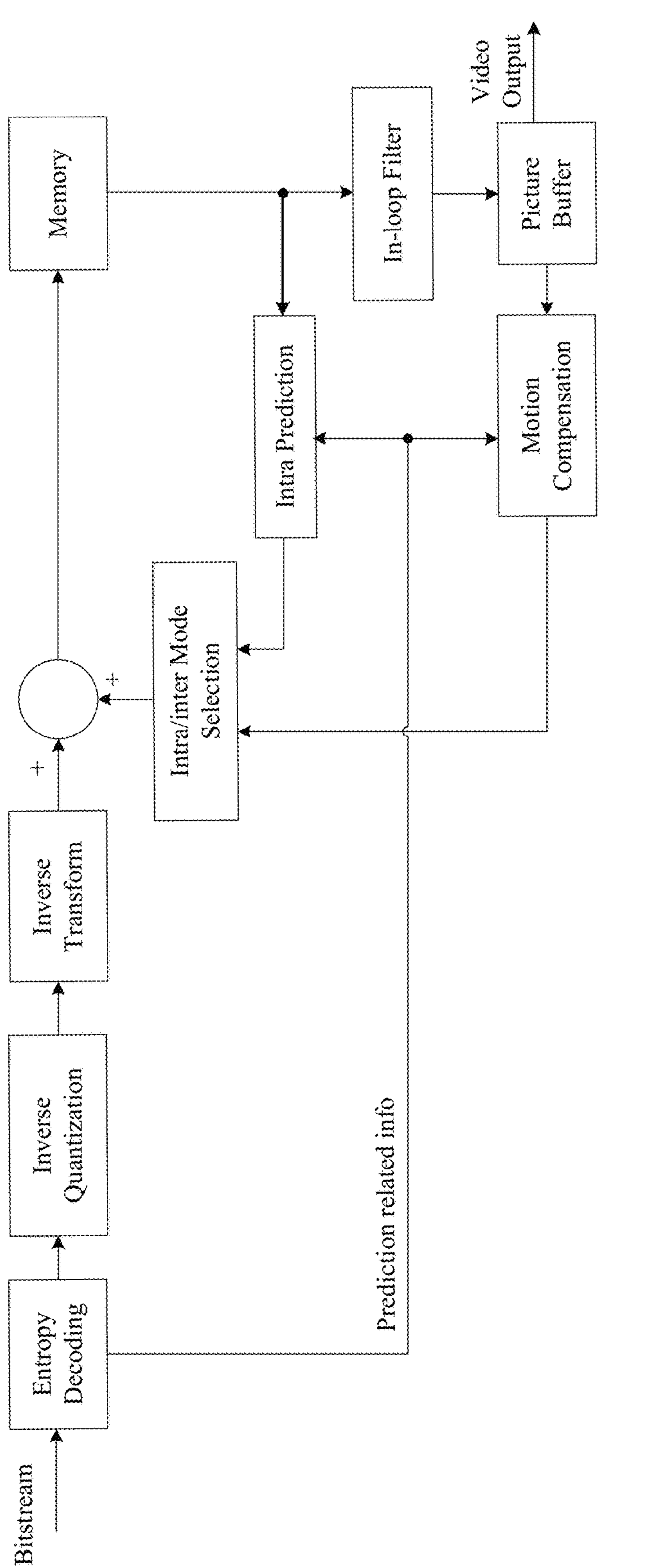
FIG. 3 illustrates a general block diagram of a block-based video decoder.

FIG. 3 illustrates a general block diagram of a block-based video decoder. The video bit-stream is first entropy decoded at entropy decoding unit. The coding mode and prediction information are sent to either the spatial prediction unit (if intra coded) or the temporal prediction unit (if inter coded) to form the prediction block. The residual transform coefficients are sent to inverse quantization unit and inverse transform unit to reconstruct the residual block. The prediction block and the residual block are then added together. The reconstructed block may further go through in-loop filtering before it is stored in reference picture store. The reconstructed video in reference picture store is then sent out to drive a display device, as well as used to predict future video blocks.

To reduce the cross-component redundancy, a cross-component linear model (CCLM) prediction mode is used in the VVC, for which the chroma samples are predicted based on the reconstructed luma samples of the same CU by using a linear model as follows:

$$pred_C(i,j) = \alpha \cdot rec_L'(i,j) + \beta \tag{1}$$

where $pred_C(i,j)$ represents the predicted chroma samples in a CU and $rec_L'(i,j)$ represents the down-sampled reconstructed luma samples of the same CU which are obtained by performing down-sampling on the reconstructed luma samples $rec_L(i,j)$, and $\alpha$ and $\beta$ are linear model parameters which are derived from at most four neighboring chroma samples and their corresponding down-sampled luma samples, which may be referred to as neighboring luma-chroma sample pairs. Suppose that a current chroma block has a size of W×H, then W' and H' are obtained as follows:

$W'=W$, $H'=H$ when LM mode is applied;

$W'=W+H$ when LM-A mode is applied;

$H'=H+W$ when LM-L mode is applied;

Where in the LM mode, above samples and left samples of the CU are used together to calculate the linear model coefficients; in the LM_A mode, only the above samples of the CU are used to calculate the linear model coefficients; and in the LM_L mode, only the left samples of the CU are used to calculate the linear model coefficients.

If locations of above neighboring samples of a chroma block are denoted as S[0, −1] . . . S[W'−1, −1] and locations of left neighboring samples of the chroma block are denoted as S[−1, 0] . . . S[−1, H'−1], positions of four neighboring chroma samples are selected as follows:

S[W'/4,−1],S[3*W'/4,−1],S[−1,H'/4],S[−1,3*H'/4] are selected as the positions of the four neighboring chroma samples when LM mode is applied and both above and left neighboring samples are available;

S[W'/8,−1],S[3*W'/8,],S[5*W'/8,−1],S[7*W'/8,−1] are selected as the positions of the four neighboring chroma samples when LM-A mode is applied or only the above neighboring samples are available;

S[−1,H'/8], S[−1, 3*H'/8], S[−1, 5*H'/8], S[−1, 7*H'/8] are selected as the positions of the four neighboring chroma samples when LM-L mode is applied or only the left neighboring samples are available;

The four neighboring luma samples corresponding to the selected locations are obtained by a down-sampling operation and the obtained four neighboring luma samples are compared four times to find two larger values: $x^0_A$ and $x^1_A$, and two smaller values: $x^0_B$ and $x^1_B$. Chroma sample values corresponding to the two larger values and the two smaller values are denoted as $y^0_A$, $y^1_A$, $y^0_B$ and $y^1_B$ respectively. Then $X_a$, $X_b$, $Y_a$ and $Y_b$ are derived as:

$$X_a = (x_A^0 + x_A^1 + 1) \gg 1; \quad (2)$$

$$X_b = (x_B^0 + x_B^1 + 1) \gg 1;$$

$$Y_a = (y_A^0 + y_A^1 + 1) \gg 1;$$

$$Y_b = (y_B^0 + y_B^1 + 1) \gg 1$$

Finally, the linear model parameters α and β are obtained according to the following equations.

$$\alpha = \frac{Y_a - Y_b}{X_a - X_b} \quad (3)$$

$$\beta = Y_b - \alpha \cdot X_b \quad (4)$$

Figure 4:
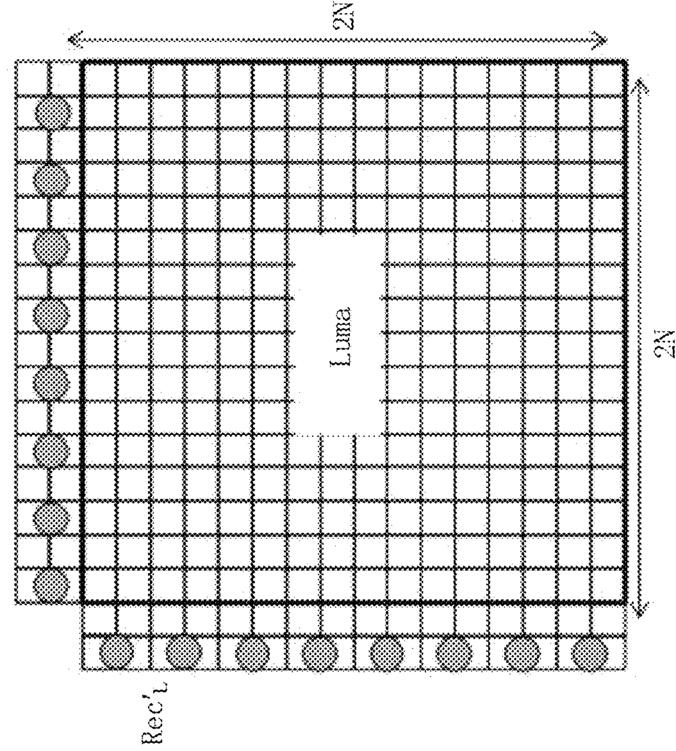
FIG. 4 illustrates an example of the locations of the left and above samples and the sample of the current block involved in the CCLM mode.
Figure 4:
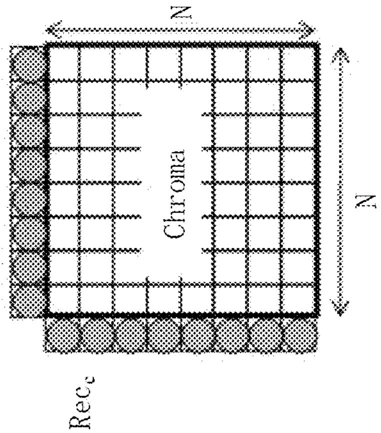

FIG. 4 illustrates an example of the locations of the left and above samples and the sample of the current block involved in the CCLM mode, including locations of left and above samples of an N×N chroma block in the CU and locations of left and above samples of an 2N×2N luma block in the CU.

The division operation to calculate parameter α is implemented with a look-up table. To reduce the memory required for storing the table, the diff value (difference between maximum and minimum values) and the parameter α are expressed by an exponential notation. For example, diff is approximated with a 4-bit significant part and an exponent. Consequently, the table for 1/diff is reduced into 16 elements for 16 values of the significand as follows:

$$DivTable\ [\ ] = \{0, 7, 6, 5, 5, 4, 4, 3, 3, 2, 2, 1, 1, 1, 1, 0\} \quad (5)$$

This would have a benefit of both reducing the complexity of the calculation as well as the memory size required for storing the needed tables Besides the above template and left template can be used to calculate the linear model coefficients together, they also can be used alternatively in the other 2 LM modes, called LM_A, and LM_L modes.

In LM_T mode, only the above template is used to calculate the linear model coefficients. To get more samples, the above template is extended to (W+H) samples. In LM_L mode, only left template is used to calculate the linear model coefficients. To get more samples, the left template is extended to (H+W) samples.

In LM_LT mode, left and above templates are used to calculate the linear model coefficients.

To match the chroma sample locations for 4:2:0 video sequences, two types of down-sampling filter are applied to luma samples to achieve 2 to 1 down-sampling ratio in both horizontal and vertical directions. The selection of down-sampling filter is specified by a SPS level flag. The two down-sampling filters are as follows, which are corresponding to "type-0" and "type-2" content, respectively.

$$Rec'_L(i, j) = \begin{bmatrix} rec_L(2i-1, 2j-1) + 2 \cdot rec_L(2i, 2j-1) + \\ rec_L(2i+1, 2j-1) + rec_L(2i-1, 2j) + \\ 2 \cdot rec_L(2i, 2j) + rec_L(2i+1, 2j) + 4 \end{bmatrix} \gg 3 \quad (6)$$

$$rec'_L(i, j) = \begin{bmatrix} rec_L(2i, 2j-1) + rec_L(2i-1, 2j) + \\ 4 \cdot rec_L(2i, 2j) + rec_L(2i+1, 2j) + \\ rec_L(2i, 2j+1) + 4 \end{bmatrix} \gg 3 \quad (7)$$

Note that only one luma line (general line buffer in intra prediction) is used to make the down-sampled luma samples when the upper reference line is at the CTU boundary.

This parameter computation is performed as part of the decoding process, and is not just as an encoder search operation. As a result, no syntax is used to convey the α and β values to the decoder.

For chroma intra mode coding, a total of 8 intra modes are allowed for chroma intra mode coding. Those modes include five traditional intra modes and three cross-component linear model modes (CCLM, LM_A, and LM_L). Chroma mode signalling and derivation process are shown in Table 1. Chroma mode coding directly depends on the intra prediction mode of the corresponding luma block. Since separate block partitioning structure for luma and chroma components is enabled in I slices, one chroma block may correspond to multiple luma blocks. Therefore, for Chroma DM mode, the intra prediction mode of the corresponding luma block covering the center position of the current chroma block is directly inherited.

TABLE 1

Derivation of chroma prediction mode from luma mode when cclm is enabled

| Chroma prediction mode | Corresponding luma intra prediction mode | | | | |
|---|---|---|---|---|---|
| | 0 | 50 | 18 | 1 | X ( 0 <= X <= 66 ) |
| 0 | 66 | 0 | 0 | 0 | 0 |
| 1 | 50 | 66 | 50 | 50 | 50 |
| 2 | 18 | 18 | 66 | 18 | 18 |
| 3 | 1 | 1 | 1 | 66 | 1 |
| 4 | 0 | 50 | 18 | 1 | X |
| 5 | 81 | 81 | 81 | 81 | 81 |
| 6 | 82 | 82 | 82 | 82 | 82 |
| 7 | 83 | 83 | 83 | 83 | 83 |

A single binarization table is used regardless of the value of sps_cclm_enabled_flag as shown in Table 2.

TABLE 2

Unified binarization table for chroma prediction mode

| Value of intra_chroma_pred_mode | Bin string |
|---|---|
| 4 | 00 |
| 0 | 0100 |
| 1 | 0101 |
| 2 | 0110 |
| 3 | 0111 |
| 5 | 10 |
| 6 | 110 |
| 7 | 111 |

In Table 2, the first bin indicates whether it is regular (0) or LM modes (1). If it is LM mode, then the next bin indicates whether it is LM_CHROMA (0) or not. If it is not LM_CHROMA, next 1 bin indicates whether it is LM_L (0) or LM_A (1). For this case, when sps_cclm_enabled_flag is 0, the first bin of the binarization table for the corresponding intra_chroma_pred_mode can be discarded prior to the entropy coding. Or, in other words, the first bin is inferred to be 0 and hence not coded. This single binarization table is used for both sps_cclm_enabled_flag equal to 0 and 1 cases. The first two bins in Table 2 are context coded with its own context model, and the rest bins are bypass coded.

In addition, in order to reduce luma-chroma latency in dual tree, when the 64×64 luma coding tree node is partitioned with Not Split (and ISP is not used for the 64×64 CU) or QT, the chroma CUs in 32×32/32×16 chroma coding tree node are allowed to use CCLM in the following way:

If the 32×32 chroma node is not split or partitioned QT split, all chroma CUs in the 32×32 node can use CCLM.

If the 32×32 chroma node is partitioned with Horizontal BT, and the 32×16 child node does not split or uses Vertical BT split, all chroma CUs in the 32×16 chroma node can use CCLM.

In all the other luma and chroma coding tree split conditions, CCLM is not allowed for chroma CU.

During the ECM development, the simplified derivation of α and β (min-max approximation) is removed. Instead, linear least square solution between causal reconstructed data of down-sampled luma samples and causal chroma samples to derive model parameters α and β.

$$\alpha = \frac{I \times \sum_{i=0}^{I} Rec_C(i) \times Rec'_L(i) - \sum_{i=0}^{I} Rec_C(i) \times \sum_{i=0}^{I} Rec'_L(i)}{I \times \sum_{i=0}^{I} Rec'_L(i) \times Rec'_L(i) - \left(\sum_{i=0}^{I} Rec'_L(i)\right)^2} = \frac{A_1}{A_2} \quad (8)$$

$$\beta = \frac{\sum_{i=0}^{I} Rec_C(i) - \alpha \times \sum_{i=0}^{I} Rec'_L(i)}{I} \quad (9)$$

Where $Rec_C(i)$ and $Rec'_L(i)$ indicate reconstructed chroma samples and down-sampled luma samples around the target block, I indicates total samples number of neighboring data.

Figure 5:
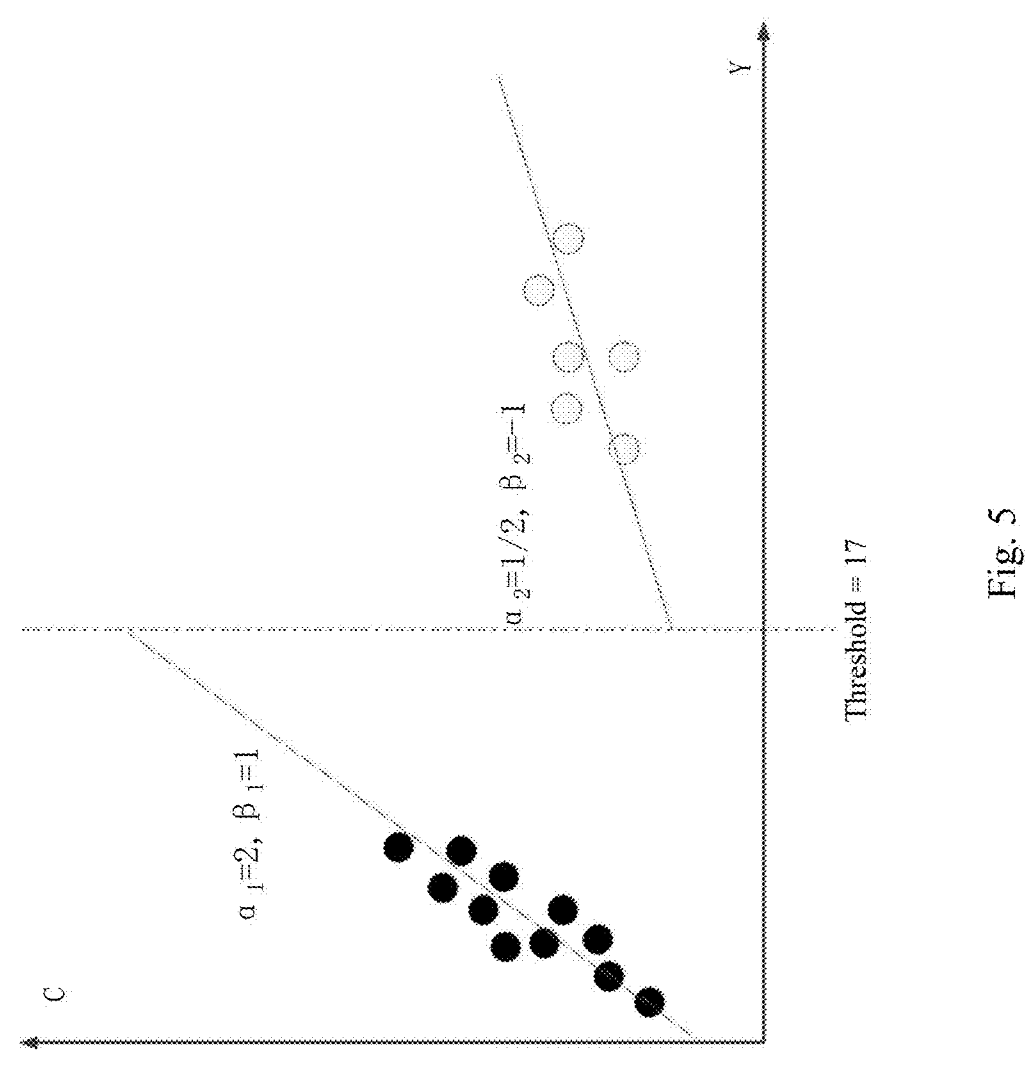
FIG. 5 illustrates an example of classifying the neighboring samples into two groups based on the value Threshold.

In ECM-1.0, Multi-model LM (MMLM) prediction mode is proposed, for which the chroma samples are predicted based on the reconstructed luma samples of the same CU by using two linear models as follows:

$$\begin{cases} pred_C(i,j) = \alpha_1 \cdot rec'_L(i,j) + \beta_1 & \text{if } rec'_L(i,j) \le \text{Threshold} \\ pred_C(i,j) = \alpha_2 \cdot rec'_L(i,j) + \beta_2 & \text{if } rec'_L(i,j) > \text{Threshold} \end{cases} \quad (10)$$

Where $pred_C(i,j)$ represents the predicted chroma samples in a CU and $rec_L'(i,j)$ represents the down-sampled reconstructed luma samples of the same CU. Threshold is calculated as the average value of the neighboring reconstructed luma samples. FIG. 5 illustrates an example of classifying the neighboring samples into two groups based on the value Threshold. For each group, parameter $\alpha_i$ and $\beta_i$, with i equal to 1 and 2 respectively, are derived from the straight-line relationship between luma values and chroma values from two samples, which are minimum luma sample A $(X_A, Y_A)$ and maximum luma sample B $(X_B, Y_B)$ inside the group. Here $X_A, Y_A$ are the x-coordinate (i.e., luma value) and y-coordinate (i.e., chroma value) value for sample A, and $X_B, Y_B$ are the x-coordinate and y-coordinate value for sample B. The linear model parameters α and β are obtained according to the following equations.

$$\alpha = \frac{y_B - y_A}{x_B - x_A} \quad (11)$$

$$\beta = y_A - \alpha x_A$$

Such a method is also called min-max method. The division in the equation above could be avoided and replaced by a multiplication and a shift.

For a coding block with a square shape, the above two equations are applied directly. For a non-square coding block, the neighboring samples of the longer boundary are first subsampled to have the same number of samples as for the shorter boundary.

Besides the scenario wherein the above template and the left template are used together to calculate the linear model coefficients, the two templates also can be used alternatively in the other two MMLM modes, called MMLM_A, and MMLM_L modes.

In MMLM_A mode, only pixel samples in the above template are used to calculate the linear model coefficients. To get more samples, the above template is extended to the size of (W+W). In MMLM_L mode, only pixel samples in the left template are used to calculate the linear model coefficients. To get more samples, the left template is extended to the size of (H+H).

Note that when the upper reference line is at the CTU boundary, only one luma row (which is stored in line buffer for intra prediction) is used to make the down-sampled luma samples.

For chroma intra mode coding, a total of 11 intra modes are allowed for chroma intra mode coding. Those modes include five traditional intra modes and six cross-component linear model modes (CCLM, LM_A, LM_L, MMLM, MMLM_A and MMLM_L). Chroma mode signaling and derivation process are shown in Table. Chroma mode coding directly depends on the intra prediction mode of the corresponding luma block. Since separate block partitioning structure for luma and chroma components is enabled in I slices, one chroma block may correspond to multiple luma blocks. Therefore, for Chroma DM mode, the intra prediction mode of the corresponding luma block covering the center position of the current chroma block is directly inherited.

TABLE 3

| Derivation of chroma prediction mode from luma mode when MMLM_is enabled | | | | | |
|---|---|---|---|---|---|
| Chroma | Corresponding luma intra prediction mode | | | | |
| prediction mode | 0 | 50 | 18 | 1 | X ( 0 <= X <= 66 ) |
| 0 | 66 | 0 | 0 | 0 | 0 |
| 1 | 50 | 66 | 50 | 50 | 50 |
| 2 | 18 | 18 | 66 | 18 | 18 |
| 3 | 1 | 1 | 1 | 66 | 1 |
| 4 | 81 | 81 | 81 | 81 | 81 |
| 5 | 82 | 82 | 82 | 82 | 82 |
| 6 | 83 | 83 | 83 | 83 | 83 |
| 7 | 84 | 84 | 84 | 84 | 84 |
| 8 | 85 | 85 | 85 | 85 | 85 |
| 9 | 86 | 86 | 86 | 86 | 86 |
| 10 | 0 | 50 | 18 | 1 | X |

Figure 6:
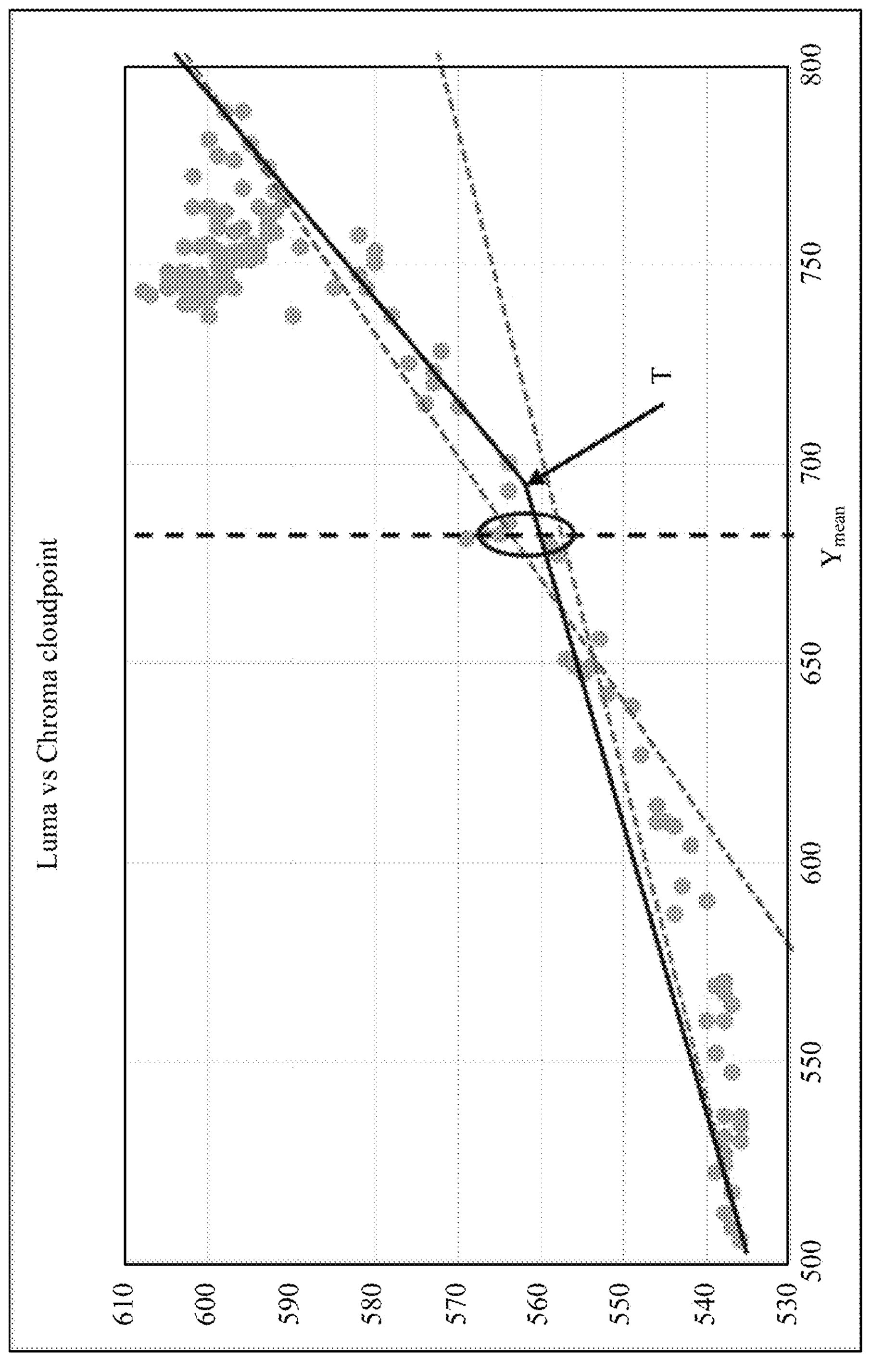
FIG. 6 shows an example of classifying the neighboring samples into two groups based on a knee point.

MMLM and LM modes may also be used together in an adaptive manner. For MMLM, two linear models are as follows:

$$\begin{cases} pred_C(i,j) = \alpha_1 \cdot rec'_L(i,j) + \beta_1 & \text{if } rec'_L(i,j) \le \text{Threshold} \\ pred_C(i,j) = \alpha_2 \cdot rec'_L(i,j) + \beta_2 & \text{if } rec'_L(i,j) > \text{Threshold} \end{cases} \quad (12)$$

Where $pred_C(i,j)$ represents the predicted chroma samples in a CU and $rec_L'(i,j)$ represents the downsampled reconstructed luma samples of the same CU. Threshold can be simply determined based on the luma and chroma average values together with their minimum and maximum values. FIG. 6 shows an example of classifying the neighboring samples into two groups based on the knee point, T, indicated by an arrow. Linear model parameter $\alpha_1$ and $\beta_1$ are derived from the straight-line relationship between luma values and chroma values from two samples, which are minimum luma sample A $(X_A, Y_A)$ and the Threshold $(X_T, Y_T)$. Linear model parameter $\alpha_2$ and $\beta_2$ are derived from the straight-line relationship between luma values and chroma values from two samples, which are maximum luma sample B $(X_B, Y_B)$ and the Threshold $(X_T, Y_T)$. Here $X_A, Y_A$ are the x-coordinate (i.e., luma value) and y-coordinate (i.e., chroma value) value for sample A, and $X_B, Y_B$ are the x-coordinate and y-coordinate value for sample B. The linear model parameters $\alpha_i$ and $\beta_i$ for each group, with i equal to 1 and 2 respectively, are obtained according to the following equations.

$$\alpha_1 = \frac{Y_T - Y_A}{X_T - X_A} \quad (13)$$

$$\beta_1 = Y_A - \alpha_1 X_A$$

$$\alpha_2 = \frac{Y_B - Y_T}{X_B - X_T}$$

$$\beta_2 = Y_T - \alpha_2 X_T$$

For a coding block with a square shape, the above equations are applied directly. For a non-square coding block, the neighboring samples of the longer boundary are first subsampled to have the same number of samples as for the shorter boundary.

Besides the scenario wherein the above template and the left template are used together to determine the linear model coefficients, the two templates also can be used alternatively in the other two MMLM modes, called MMLM_A, and MMLM_L modes respectively.

In MMLM_A mode, only pixel samples in the above template are used to calculate the linear model coefficients. To get more samples, the above template is extended to the size of (W+W). In MMLM_L mode, only pixel samples in the left template are used to calculate the linear model coefficients. To get more samples, the left template is extended to the size of (H+H).

Note that when the upper reference line is at the CTU boundary, only one luma row (which is stored in line buffer for intra prediction) is used to make the down-sampled luma samples.

For chroma intra mode coding, there is a condition check used to select LM modes (CCLM, LM_A, and LM_L) or multi-model LM modes (MMLM, MMLM_A, and MMLM_L). The condition check is as follows:

$$\begin{cases} LM \text{ modes} & \text{if } (((Y_T - Y_A) \le d \ \| \ (Y_B - Y_T) \le d) \ \& \ (\text{block area} \ge BlkSizeThres_{LM})) \\ MMLM \text{ modes} & \text{if } (((Y_T - Y_A) > d \ \&\& \ (Y_B - Y_T) > d) \ \& \ (\text{block area} \ge BlkSizeThres_{MM})) \end{cases} \quad (14)$$

where $BlkSizeThres_{LM}$ represents the smallest block size of LM modes and $BlkSizeThres_{MM}$ represents the smallest block size of MMLM modes. The symbol d represents a pre-determined threshold value. In one example, d may take a value of 0. In another example, d may take a value of 8.

For chroma intra mode coding, a total of 8 intra modes are allowed for chroma intra mode coding. Those modes include five traditional intra modes and three cross-component linear model modes. Chroma mode signaling and derivation process are shown in Table 1 Table. It is worth noting that for a given CU, if it is coded under linear model mode, whether it is a conventional single model LM mode or a MMLM mode is determined based on the condition check above. Unlike the case shown in Table 3, there are no separate MMLM modes to be signaled. Chroma mode coding directly depends on the intra prediction mode of the corresponding luma block. Since separate block partitioning structure for luma and chroma components is enabled in I slices, one chroma block may correspond to multiple luma blocks. Therefore, for Chroma DM mode, the intra prediction mode of the corresponding luma block covering the center position of the current chroma block is directly inherited.

In the existing CCLM or MMLM design, the neighboring reconstructed luma-chroma sample pairs are classified into one or more sample groups based on the value Threshold, which only considers the luma DC values. That is, a luma-chroma sample pair is classified by only considering the intensity of the luma sample. However, luma component usually preserves abundant textures, and the current luma sample may be highly correlated with neighboring luma samples, such inter-sample correlation (AC correlation) may benefit the classification of luma-chroma sample pairs and can bring additional coding efficiency.

Figures 9A, 9B:
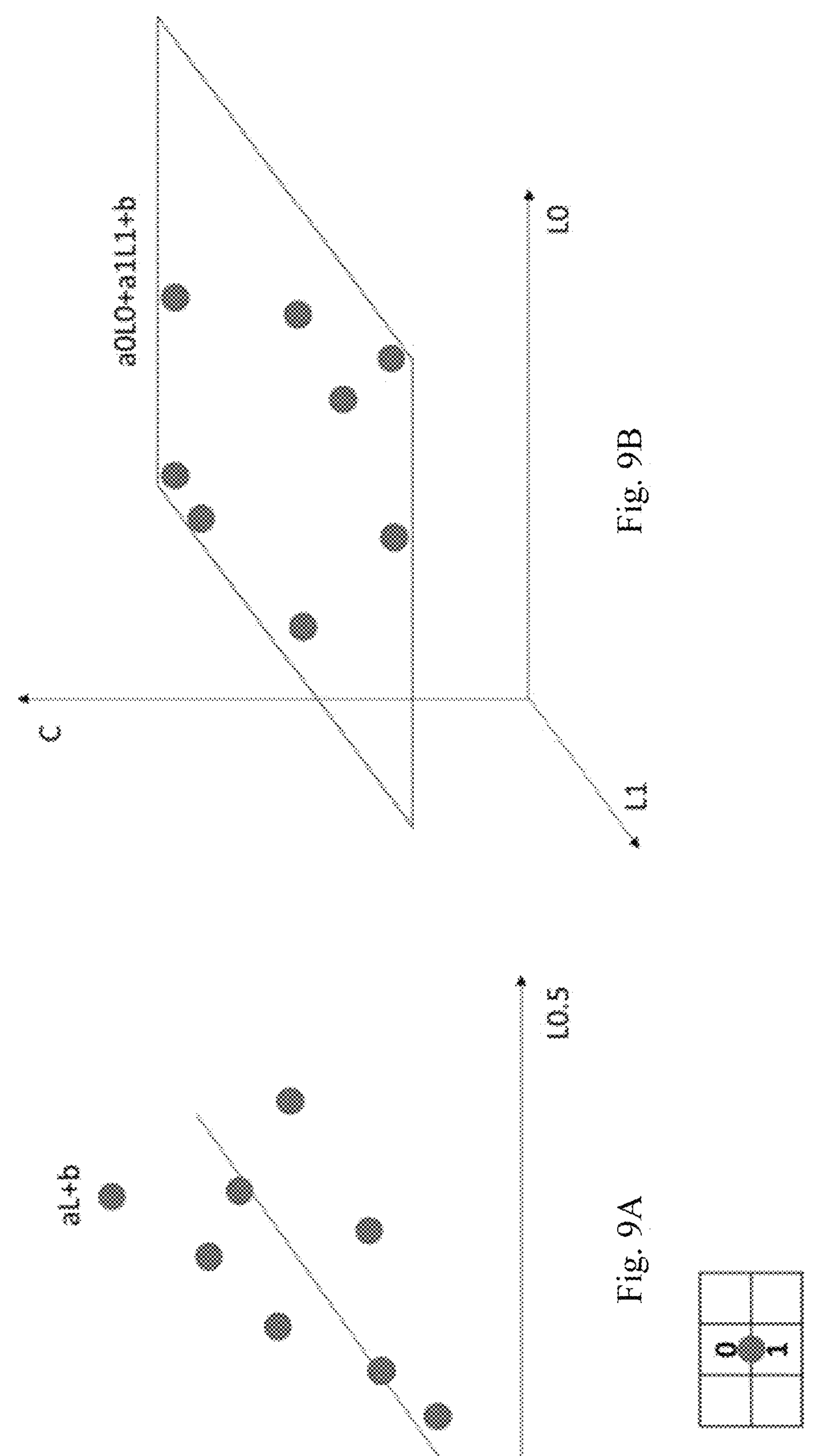
FIGS. 9A and 9B show schematic diagrams for correlation among a chroma sample and one or more luma samples.

Furthermore, as shown in FIG. 9A, the CCLM assumes a given chroma sample only correlates to a corresponding luma sample (L0.5, which can be taken as the fractional luma sample position), and a simple linear regression (SLR) with ordinary least squares (OLS) estimation is used to predict the given chroma sample. However, as shown in FIG. 9B, in some video content, one chroma sample may simultaneously correlate to multiple luma samples (AC or DC correlation), so a multiple linear regression (MLR) model may further improve the prediction accuracy.

The focus of the disclosure is to improve the coding efficiency of luma and chroma components, by introducing classifiers considering luma edge or AC information. Besides the existing band-classified MMLM, the present disclosure provides exemplar proposed classifiers. The process of generating linear prediction models for different sample groups may be similar as CCLM or MMLM (e.g., via a least square method, or a simplified min-max method, etc.), but with different metrices for classification.

The focus of the disclosure is also to derive a filter-based linear model (FLM), to further improve the prediction accuracy.

In one aspect of the present disclosure, a first classifier may be used to classify the neighboring luma samples (e.g., of the neighboring luma-chroma sample pairs) and/or the luma samples corresponding to chroma samples to be predicted. The luma samples corresponding to the chroma samples may be obtained by a down-sampling operation to match the locations of the corresponding chroma samples for 4:2:0 video sequences. For example, a luma sample corresponding to a chroma sample may be obtained by performing a down-sampling operation on more than one (e.g., 4) reconstructed luma samples corresponding to the chroma sample (e.g., located around the chroma sample). Alternatively, the luma samples may obtained directly from the reconstructed luma samples in a case of 4:4:4 video sequences, for example. Alternatively, the luma samples may be obtained from respective ones of the reconstructed luma samples that are at respective collocated positions for the corresponding chroma samples. For example, a luma sample to be classified may be obtained from one of four reconstructed luma samples corresponding to the chroma sample that is at a left-top position of the four reconstructed luma samples, which may be considered as a collocated position for the chroma sample. The first classifier may classify luma samples according to their edge strengths. For example, one direction (e.g., 0-degree, 45-degree, or 90-degree, etc.) may be selected to calculate the edge strength. A direction may be formed by a current sample and a neighboring sample along the direction (e.g., a neighboring sample located at the right-top of the current sample for 45-degree). An edge strength may be calculated by subtracting the neighbor sample from the current sample. The edge strength may be quantized into one of M segments by M−1 thresholds, and the first classifier may use M classes to classify the current sample. Alternatively or additionally, N directions may be formed by a current sample and N neighboring samples along the N directions. N edge strengths may be calculated by subtracting N neighboring samples from the current sample, respectively. Similarly, if each of the N edge strengths may be quantized into one of M segments by M−1 thresholds, then the first classifier may use $M^N$ classes to classify the current sample.

In another aspect of the present disclosure, a second classifier may be used to classify according to a local pattern. For example, a current luma sample Y0 may be compared with its neighboring N luma samples Yi. A score may be added by one if the value of Y0 is greater than that of Yi, otherwise, the score may be reduced by one. The sore may be quantized to form K classes. The second classifier may classify a current sample into one of the K classes. For example, the neighboring luma samples may be obtained from four neighbors that are located above, left, right and below the current luma samples, i.e., without diagonal neighbors.

In one or more aspects of the present disclosure, a plurality of the first classifier, the second classifier, or different instances of the first or second classifier or other classifiers described herein may be combined. For example, a first classifier may be combined with the existing MMLM threshold-based classifier. For another example, instance A of the first classifier may be combined with another instance B of the first classifier, where the instance A and B employ different directions (e.g., employing vertical and horizontal directions, respectively).

It will be appreciated by those skilled in the art that though the existing CCLM design in the VVC standard is used as the basic CCLM method in the description, the proposed cross-component method described in the disclosure can also be applied to other prediction coding tools with similar design spirits. For example, for the chroma from luma (CfL) in the AV1 standard, the proposed method can also be applied by dividing luma/chroma sample pairs into multiple sample groups.

It will be appreciated by those skilled that Y/Cb/Cr also can be denoted as Y/U/V in video coding area. If video data is of RGB format, the proposed method can also be applied by simply mapping YUV notation to GBR, for example.

Figure 7:
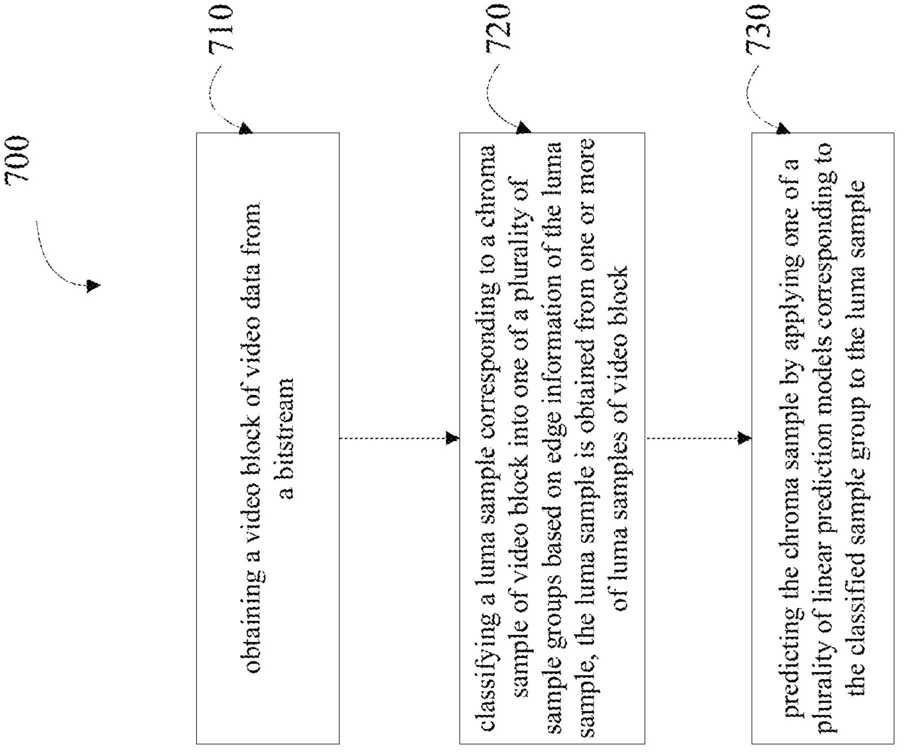
FIG. 7 illustrates a workflow of a method for decoding video data according to one or more aspects of the present disclosure.

FIG. 7 illustrates a workflow of a method 700 for decoding video data according to one or more aspects of the present disclosure. The method 700 may use any one of the classifiers described herein or any combination thereof and may be used by a video decoder (e.g., of FIG. 3). At step 710, a video block (e.g., a CU) of video data may be obtained from a bitstream. For example, an encoded block of luma samples of the video data may be received. The encoded block of luma samples may be decoded to obtain reconstructed luma samples. At step 720, a luma sample may be classified into one of a plurality of sample groups based on edge information of the luma sample. The luma sample may correspond to a chroma sample to be predicted of the video block and may be obtained from one or more of the reconstructed luma samples. For example, a down-sampling operation may be or not be performed on the reconstructed luma samples to obtain the luma sample. For example, the classification may be performed by using one of the classifiers described herein or any combination thereof. At step 730, the chroma sample may be predicted by applying one of a plurality of linear prediction models corresponding to the classified sample group to the luma sample.

In an embodiment, the classifying the luma sample into the one of the plurality of sample groups may be further based on intensity value of the luma sample (e.g., combined with the existing MMLM threshold-based classifier).

In an embodiment, each of the plurality of sample groups may correspond to a different linear prediction model of the plurality of linear prediction models.

In an embodiment, the edge information may comprise a direction and a strength of an edge of the luma sample.

In an embodiment, the classifying the luma sample into the one of the plurality of sample groups may comprise classifying the luma sample into the one of the plurality of sample groups based on a strength of an edge along one direction for the luma sample, or multiple strengths of edges along different directions for the luma samples.

In an embodiment, the method 700 may comprise classifying neighboring luma samples around the video block into the plurality of sample groups based on edge information of the neighboring luma samples. Each of the plurality of linear prediction models may be derived from neighboring luma samples classified into a sample group corresponding to that linear prediction model and neighboring chroma samples corresponding to the neighboring luma samples classified into the sample group (e.g., neighboring luma-chroma sample pairs with luma samples therein being classified into the sample group corresponding to that linear prediction model), for example, through a least square method, or a simplified min-max method, etc.

Figure 8:
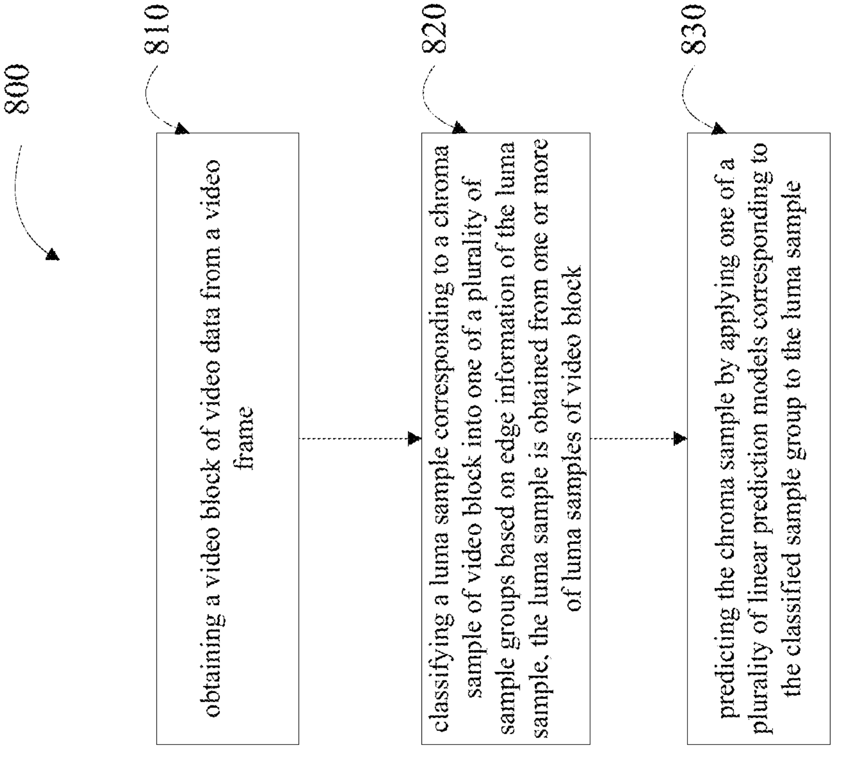
FIG. 8 illustrates a workflow of a method for encoding video data according to one or more aspects of the present disclosure.

FIG. 8 illustrates a workflow of a method 800 for encoding video data according to one or more aspects of the present disclosure. The method 800 may use any one of the classifiers described herein or any combination thereof and may be used by a video encoder (e.g., of FIG. 1). At step 810, a video block of video data may be obtained from a video frame. For example, a block of luma samples of the video data may be encoded to obtain an encoded block of luma samples. The encoded block of luma samples may be decoded to obtain reconstructed luma samples. At step 820, a luma sample corresponding to a chroma sample may be classified into one of a plurality of sample groups based on edge information of the luma sample, wherein the luma sample is obtained from one or more of the reconstructed luma samples. At step 830, the chroma sample may be predicted by applying one of a plurality of linear prediction models corresponding to the classified sample group to the luma sample.

In one or more aspects of the present disclosure, for a to-be-predicted chroma sample, the reconstructed collocated and neighboring luma samples can be used to predict the chroma sample, to capture the inter-sample correlation among the collocated luma sample, neighboring luma samples, and the chroma sample. The reconstructed luma samples are linear weighted and combined with one "offset" to generate the predicted chroma sample (C: predicted chroma sample, Li: i-th reconstructed collocated or neighboring luma samples, $\alpha_i$: filter coefficients, $\beta$: offset, N: filter taps). Note the linear weighted plus offset value directly forms the predicted chroma sample (can be low pass, high pass adaptively according to video content), and it is then added by the residual to form the reconstructed chroma sample.

$$C = \sum_{i=0}^{N-1} \alpha_i \cdot L_i + \beta \tag{15}$$

For a given CU, the top and left reconstructed luma and chroma samples can be used to derive or train the FLM parameters ($\alpha_i$, $\beta$). Like CCLM, $\alpha_i$ and $\beta$ can be derived via OLS. The top and left training samples are collected, and one pseudo inverse matrix is calculated at both encoder and decoder sides to derive the parameters, which are then used to predict the chroma samples in the given CU. Let N denotes the number of filter taps applied on luma samples, M denotes the total top and left reconstructed luma and chroma sample pairs used for training parameters, $$L_j^i$$

denotes luma sample with the i-th sample pair and the j-th filter tap, $C^i$ denotes the chroma sample with the i-th sample pair, the following equations show the derivation of the pseudo inverse matrix $A^+$, and also the parameters. FIG. 10 shows an example that N is 6 (6-tap), M is 8, top 2 rows and left 3 columns luma samples and top 1 row and left 1 column chroma samples are used to derive or train the parameters.

$$\begin{gathered}
C^0 = \alpha_0 \cdot L_0^0 + \alpha_1 \cdot L_1^0 + \ldots + \alpha_{N-1} \cdot L_{N-1}^0 + \beta \\
C^1 = \alpha_0 \cdot L_0^1 + \alpha_1 \cdot L_1^1 + \ldots + \alpha_{N-1} \cdot L_{N-1}^1 + \beta \\
C^{M-1} = \alpha_0 \cdot L_0^{M-1} + \alpha_1 \cdot L_1^{M-1} + \ldots + \alpha_{N-1} \cdot L_{N-1}^{M-1} + \beta \\
\begin{bmatrix} C^0 \\ C^1 \\ \vdots \\ \vdots \\ C^{M-1} \end{bmatrix} = \begin{bmatrix} L_0^0 & L_1^0 & \ldots & L_{N-1}^0 & 1 \\ L_0^1 & L_1^1 & \ldots & L_{N-1}^1 & 1 \\ \vdots & \vdots & \ldots & \vdots & \vdots \\ \vdots & \vdots & \ldots & \vdots & \vdots \\ L_0^{M-1} & L_1^{M-1} & \ldots & L_{N-1}^{M-1} & 1 \end{bmatrix} \begin{bmatrix} \alpha_0 \\ \alpha_1 \\ \vdots \\ \alpha_{N-1} \\ \beta \end{bmatrix} \\
b = Ax \\
x = (A^T A)^{-1} A^T b = A^+ b
\end{gathered} \tag{16}$$

Please note that one can predict the chroma sample by only $\alpha_i$ without the offset $\beta$, which may be a subset of the proposed method.

Please note that though the existing CCLM design in the VVC standard is used as the basic CCLM method in the following description, to a person skilled in the art of video coding, the proposed cross-component method described in the disclosure can also be applied to other prediction coding tools with similar design spirits. For example, for the chroma from luma (CfL) in the AV1 standard, the proposed FLM can also be applied by including multiple luma samples to the MLR model.

Note Y/Cb/Cr also can be denoted as Y/U/V in video coding area.

Note if the video is RGB format, the proposed FLM can also be applied by simply mapping YUV notation to GBR in the below paragraphs, for example.

Note the figures in this disclosure can be combined with all examples mentioned in this disclosure.

Figure 11:
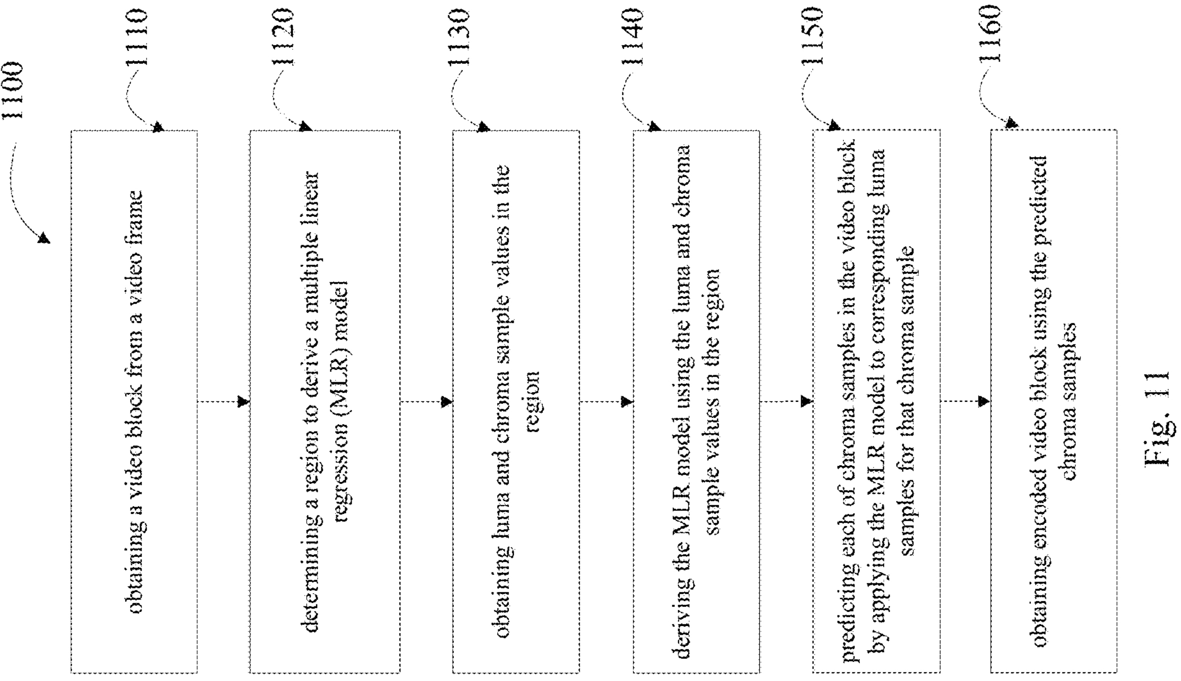
FIG. 11 illustrates a workflow of a method for encoding video data according to one or more aspects of the present disclosure.

FIG. 11 illustrates a workflow of a method 1100 for encoding video data according to one or more aspects of the present disclosure. At step 1110, a video block (e.g., a CU comprising a luma block and/or a chroma block) may be obtained from a video frame. At step 1120, a region used to derive a multiple linear regression (MLR) model may be determined. For example, the region may comprise left one or more columns and/or top one or more rows of reconstructed chroma and luma samples neighboring to the chroma block and its collocated luma block, e.g., left 3 columns and top 2 rows of reconstructed luma sample neighboring to the collocated luma block, and left 1 column and top 1 row neighboring to the chroma block, as shown in FIG. 10.

At step 1130, luma and chroma sample values in the region may be obtained. For example, values of the reconstructed luma and chroma samples in the region may be directed used without any modifying, such as down-sampling, etc.

At step 1140, the MLR model may be derived using the luma and chroma sample values in the region. The MLR model may comprise at least two coefficients $\alpha_i$ (i=0 . . . N−1, N is the number of filter taps) and one offset $\beta$. For example, an MLR model with six coefficients $\alpha_i$ (i.e., the number of filter taps is six, i=0 . . . 5) and one offset $\beta$ may be derived, to use six luma samples and one offset to predict one chroma sample. The derivation of the MLR model may comprise a pseudo inverse matrix calculation and a normal equation, and to derive the scalar $\beta$, the rightmost column in $A^+$ must be set to 1.

At step 1150, each of chroma samples in the video block may be predicted by applying the MLR model to corresponding luma samples for that chroma sample. The corresponding luma samples for each chroma sample (e.g., chroma samples 0', as shown in FIG. 10) may comprise collocated luma samples (e.g., luma samples 0', 1', 2', 3', 4' and 5', as shown in FIG. 10) for that chroma sample. For example, values of the reconstructed collocated luma samples may be directed used without any modifying, such as down-sampling, etc.

At step 1160, an encoded video block may be obtained using the predicted chroma samples. For example, the encoded video block may be included in a bitstream to transmit or for storage.

Figure 12:
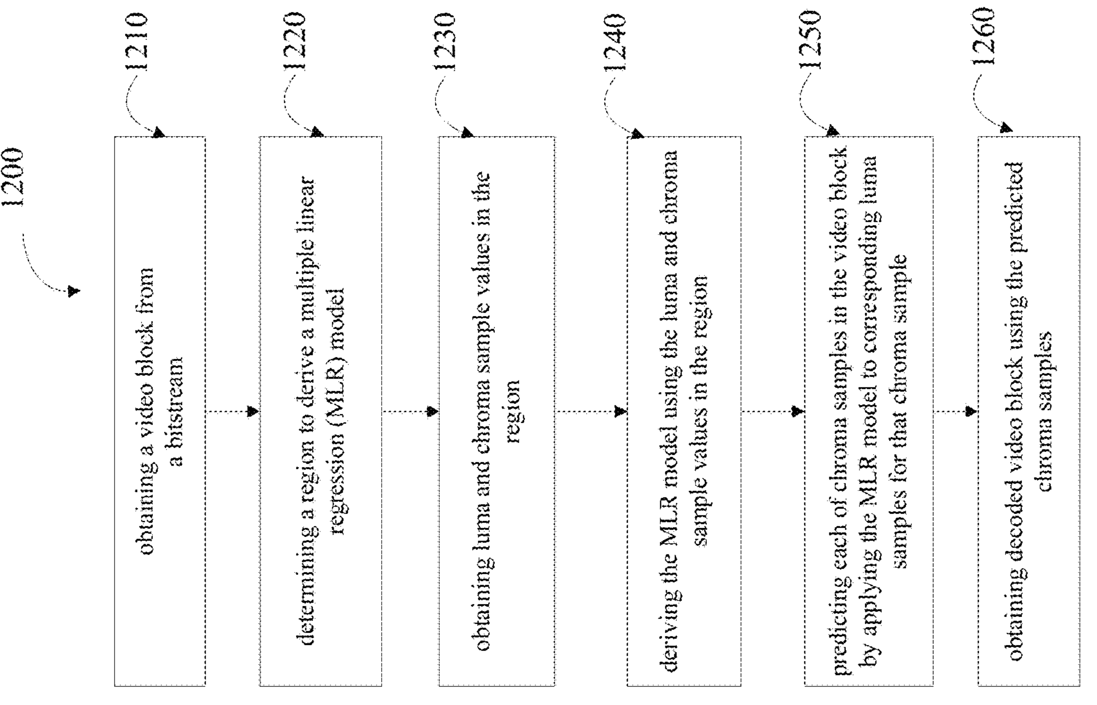
FIG. 12 illustrates a workflow of a method for decoding video data according to one or more aspects of the present disclosure.

FIG. 12 illustrates a workflow of a method 1200 for decoding video data according to one or more aspects of the present disclosure. Method 1200 may be similar to method 1100, and the processes or steps of method 1200 may correspond to that of method 1100. At step 1210, a video block (e.g., a CU) may be obtained from a bitstream. At step 1220, a region used to derive a multiple linear regression (MLR) model may be determined. At step 1230, luma and chroma sample values in the region may be obtained. At step 1240, the MLR model may be derived using the luma and chroma sample values in the region. At step 1250, each of chroma samples in the video block may be predicted by applying the MLR model to corresponding luma samples for that chroma sample. At step 1260, a decoded video block may be obtained using the predicted chroma samples.

Figure 13:
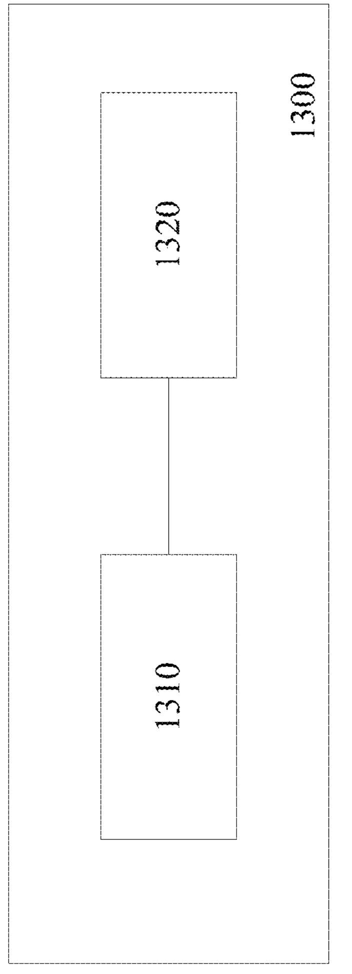
FIG. 13 illustrates an exemplary computing system according to one or more aspects of the present disclosure.

FIG. 13 illustrates an exemplary computing system 1300 according to one or more aspects of the present disclosure. The computing system 1300 may comprise at least one processor 1310. The computing system 1300 may further comprise at least one storage device 1320. The storage device 1320 may store computer-executable instructions that, when executed, cause the processor 1310 to perform the steps of methods 700, 800, 1100 and 1200 described above with reference to FIGS. 7-8, and 11-12. The processor 1310 may be a general-purpose processor, or may also be implemented as a combination of computing devices, e.g., a combination of a DSP and a microprocessor, multiple microprocessors, one or more microprocessors in conjunction with a DSP core, or any other such configuration. The storage device 1320 may store the input data, output data, data generated by processor 1310, and/or instructions executed by processor 1310.

It should be appreciated that the storage device 1320 may store computer-executable instructions that, when executed, cause the processor 1310 to perform any operations according to the embodiments of the present disclosure as described in connection with FIGS. 1-12.

The embodiments of the present disclosure may be embodied in a computer-readable medium such as non-transitory computer-readable medium. The non-transitory computer-readable medium may comprise instructions that, when executed, cause one or more processors to perform any operations according to the embodiments of the present disclosure as described in connection with FIGS. 1-12. For example, the instructions, when executed, may cause one or more processors to receive a bitstream and perform the decoding operations as described above. For another example, the instructions, when executed, may cause one or more processors to perform the encoding operations and transmit a bitstream comprising the encoded video information associated with the predicted chroma sample as described above.

It should be appreciated that all the operations in the methods described above are merely exemplary, and the present disclosure is not limited to any operations in the methods or sequence orders of these operations, and should cover all other equivalents under the same or similar concepts.

It should also be appreciated that all the modules in the methods described above may be implemented in various approaches. These modules may be implemented as hardware, software, or a combination thereof. Moreover, any of these modules may be further functionally divided into sub-modules or combined together.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein. All structural and functional equivalents to the elements of the various aspects described throughout the present disclosure that are known or later come to be known to those of ordinary skill in the art are expressly incorporated herein by reference and are intended to be encompassed by the claims.

What is claimed is:

1. A method for decoding video data, comprising:
obtaining a video block from a bitstream;
determining a region to derive a multiple linear regression (MLR) model;
obtaining luma and chroma sample values in the region;
deriving the MLR model using the luma and chroma sample values in the region;
predicting each of chroma samples in the video block by applying the MLR model to corresponding multiple luma samples for that chroma sample; and
obtaining decoded video block using the predicted chroma samples.

2. The method of claim 1, wherein the MLR model comprises at least two coefficients $\alpha_i$(i=0 . . . N−1, N is the number of filter taps) and one offset $\beta$.

3. The method of claim 1, wherein the region comprises left one or more columns and/or top one or more rows of reconstructed chroma samples and corresponding luma samples neighboring to the video block.

4. The method of claim 3, wherein the obtaining luma and chroma sample values in the region comprises:
directly using values of the reconstructed chroma samples and corresponding luma samples without any modifying.

5. The method of claim 1, wherein the deriving the MLR model using the luma and chroma sample values in the region comprises:
deriving an MLR model with six coefficients $\alpha_i$ (i=0 . . . 5) and one offset $\beta$, to use six luma samples and one offset to predict one chroma sample.

6. The method of claim 1, wherein the deriving the MLR model using the luma and chroma sample values in the region comprises:
using pseudo inverse matrix calculation and normal equation to derive the MLR model.

7. The method of claim 1, wherein the predicting each of chroma samples in the video block comprises:
directly using values of reconstructed corresponding luma samples without any modifying.

8. A computer system, comprising:

one or more processors; and one or more storage devices storing computer-executable instructions that, when executed, cause the one or more processors to:

obtain a video block from a bitstream, determine a region to derive a multiple linear regression (MLR) model, obtain luma and chroma sample values in the region, derive the MLR model using the luma and chroma sample values in the region, predict each of chroma samples in the video block by applying the MLR model to corresponding multiple luma samples for that chroma sample, and obtain decoded video block using the predicted chroma samples.

9. The computer system of claim 8, wherein the MLR model comprises at least two coefficients $\alpha_i$ (i=0 . . . N−1, N is the number of filter taps) and one offset $\beta$.

10. The computer system of claim 8, wherein the region comprises left one or more columns and/or top one or more rows of reconstructed chroma samples and corresponding luma samples neighboring to the video block.

11. The computer system of claim 10, wherein the computer-executable instructions, when executed, further cause the one or more processors to:

directly use values of the reconstructed chroma samples and corresponding luma samples without any modifying.

12. The computer system of claim 8, wherein the computer-executable instructions, when executed, further cause the one or more processors to:

derive an MLR model with six coefficients $\alpha_i$ (i=0 . . . 5) and one offset, to use six luma samples and one offset to predict one chroma sample.

13. The computer system of claim 8, wherein the computer-executable instructions, when executed, further cause the one or more processors to:

use pseudo inverse matrix calculation and normal equation to derive the MLR model.

14. The computer system of claim 8, wherein the computer-executable instructions, when executed, further cause the one or more processors to:

directly use values of reconstructed corresponding luma samples without any modifying.

15. A method for storing a bitstream, comprising:

generating a bitstream by performing an encoding method; and storing the bitstream, wherein the encoding method comprises:

obtaining a video block from a video frame;

determining a region to derive a multiple linear regression (MLR) model;

obtaining luma and chroma sample values in the region;

deriving the MLR model using the luma and chroma sample values in the region;

predicting each of chroma samples in the video block by applying the MLR model to corresponding multiple luma samples for that chroma sample; and obtaining encoded video block using the predicted chroma samples.

16. The method of claim 15, wherein the MLR model comprises at least two coefficients $\alpha_i$ (i=0 . . . N−1, N is the number of filter taps) and one offset $\beta$.

17. The method of claim 15, wherein the region comprises left one or more columns and/or top one or more rows of reconstructed chroma samples and corresponding luma samples neighboring to the video block.

18. The method of claim 17, wherein the obtaining luma and chroma sample values in the region comprises:

directly using values of the reconstructed chroma samples and corresponding luma samples without any modifying.

19. The method of claim 15, wherein the deriving the MLR model using the luma and chroma sample values in the region comprises:

deriving an MLR model with six coefficients $\alpha_i$ (i=0 . . . 5) and one offset $\beta$, to use six luma samples and one offset to predict one chroma sample.

20. The method of claim 15, wherein the deriving the MLR model using the luma and chroma sample values in the region comprises:

using pseudo inverse matrix calculation and normal equation to derive the MLR model.

* * * * *